United States Patent [19]

Bloom et al.

[11] Patent Number: 5,248,481
[45] Date of Patent: Sep. 28, 1993

[54] DIESEL PARTICULATE TRAP OF PERFORATED TUBES HAVING LATERALLY OFFSET CROSS-WOUND WRAPS OF INORGANIC YARN

[75] Inventors: Richard L. Bloom, Woodville; Troy K. Ista, River Falls, both of Wis.; Mark P. Smith, Lino Lakes, Minn.

[73] Assignee: Minnesota Mining and Manufacturing Company, St. Paul, Minn.

[21] Appl. No.: 881,488

[22] Filed: May 11, 1992

[51] Int. Cl.⁵ .................... B01D 50/00; B01D 53/34
[52] U.S. Cl. .................................. 422/171; 422/174; 422/180; 422/181; 55/484; 55/520; 55/523; 55/DIG. 10; 55/DIG. 30; 60/311; 60/299
[58] Field of Search ........... 422/171, 174, 180, 181; 55/DIG. 10, DIG. 30, 484, 267, 520, 523; 60/311, 299

[56] References Cited

U.S. PATENT DOCUMENTS

| | | | |
|---|---|---|---|
| 3,843,561 | 10/1974 | Sobel | 252/465 |
| 3,869,267 | 3/1975 | Gaylor | 55/492 |
| 3,920,428 | 11/1975 | Kinsley, Jr. | 55/528 |
| 4,264,346 | 4/1981 | Mann | 55/523 |
| 4,276,071 | 6/1981 | Outland | 55/523 |
| 4,324,572 | 4/1982 | Erdmannsdörfer et al. | 55/385 |
| 4,376,637 | 3/1983 | Yang | 55/2 |
| 4,427,418 | 1/1984 | Kogiso et al. | 55/287 |
| 4,456,457 | 6/1984 | Nozawa et al. | 55/283 |
| 4,543,113 | 9/1985 | Forester et al. | 55/378 |
| 4,576,799 | 3/1986 | Wörner et al. | 422/176 |
| 4,613,350 | 9/1986 | Forester et al. | 65/2 |
| 4,744,216 | 5/1988 | Rao et al. | 60/303 |
| 4,813,231 | 3/1989 | Bykowski | 60/274 |
| 4,940,476 | 7/1990 | Buck | 55/486 |
| 5,042,249 | 8/1991 | Erdmannsdoerfer | 60/299 |
| 5,171,341 | 12/1992 | Merry | 55/484 |
| 5,174,968 | 12/1992 | Whittenberger | 422/174 |
| 5,174,969 | 12/1992 | Fischer et al. | 422/180 |

FOREIGN PATENT DOCUMENTS

| | | |
|---|---|---|
| 0275372A1 | 7/1988 | European Pat. Off. |
| 0275372 | 1/1990 | European Pat. Off. |
| 0358522 | 3/1990 | European Pat. Off. |
| 3545762 | 7/1987 | Fed. Rep. of Germany |
| 3602153 | 7/1987 | Fed. Rep. of Germany |
| 3731766 | 3/1989 | Fed. Rep. of Germany |
| 3828516 | 3/1989 | Fed. Rep. of Germany |
| 3800723 | 7/1989 | Fed. Rep. of Germany |
| 3801634 | 8/1989 | Fed. Rep. of Germany |
| 3806131 | 8/1989 | Fed. Rep. of Germany |
| 3910554 | 10/1989 | Fed. Rep. of Germany |
| 3823205 | 1/1990 | Fed. Rep. of Germany |
| 1543488 | 10/1968 | France |
| 2193656 | 2/1988 | United Kingdom |

OTHER PUBLICATIONS

U.S. application Ser. No. 07/681,147, filed Apr. 5, 1991, entitled "Diesel Particulate Trap of Perforated Tubes Wrapped with Cross-Wound Inorganic Yarn to Form 4-Sided Filter Traps".

Japanese Abstract No. 56-46405 (Sumiyoshi), published Oct. 7, 1982.

SAE Technical Paper Series, 870011, entitled "Urban Bus Application of a Ceramic Fiber Coil Particulate Trap," 1987, H. O. Hardenberg, pp. 17–25.

(List continued on next page.)

Primary Examiner—James C. Housel
Assistant Examiner—N. Bhat
Attorney, Agent, or Firm—Gary L. Griswold; Walter N. Kirn; Gregory D. Allen

[57] ABSTRACT

An efficient, economical, compact diesel particulate trap has a plurality of perforated hollow tubes, on each of which a heat-resistant yarn is helically cross-wound to provide a plurality of layers that function as a filtering element. The yarn, which preferably is a continuous-filament ceramic yarn, has a core from which filaments or fiber segments project outwardly and intermesh with fiber segments of laterally spaced cores to provide traps. The cores of yarn convolutions of at least one layer are laterally offset from the cores of convolutions of an adjacent layer to deflect into tortuous paths gases flowing generally radially through the filtering element.

19 Claims, 3 Drawing Sheets

OTHER PUBLICATIONS

SAE Technical Paper Series, 870015, entitled "Experiences in the Development of Ceramic Fiber Coil Particulate Traps," 1987, H. O. Hardenberg and H. L. Daudel, pp. 67-78.

Sales Brochure entitled "Filter Cartridge Sealing Systems," from Filterite (a Brunswick Corporation) of Timonium, Md., Bulletin No. 1795.

U.S. Ser. No. 07/631,434, filed Dec. 21, 1990.

U.S. application Ser. No. 07/680,812, filed Apr. 5, 1991, entitled "Electrically Regenerable Diesel Particulate Trap".

U.S. application Ser. No. 07/682,100, filed Apr. 5, 1991, entitled "Concentric-Tube Diesel Particulate Filter".

DIESEL PARTICULATE TRAP OF PERFORATED TUBES HAVING LATERALLY OFFSET CROSS-WOUND WRAPS OF INORGANIC YARN

BACKGROUND OF THE INVENTION

1. Field of the Invention

The invention concerns filters or traps that remove particulates from the exhaust of diesel engines and is particularly concerned with traps containing perforated hollow tubes, each of which is wound with heat-resistant yarn to provide the filtering element.

2. Description of the Related Art

Coassigned U.S. patent application Ser. No. 07/681,147, filed Apr. 5, 1991 (Bloom) discloses a diesel particulate trap having a casing containing at least one perforated hollow tube which is helically cross-wound with a heat-resistant yarn (e.g., resistant to temperatures above about 600° C.) that has a core from which filaments or fiber segments projects outwardly. The core of each convolution of the yarn is radially aligned with the core of an underlying convolution to form walls that are spaced to define four sided openings. The projecting fiber segments intermesh across each opening. Means for blocking spaces at the ends of the casing require exhaust entering an unblocked space at one end of the casing to pass generally radially through the four sided openings, thus allowing the intermeshed filaments or fiber segments to trap soot or particulate carried by the exhaust. Diesel particulate traps illustrated in the Bloom application have several tubes that either are concentric or in a side-by-side arrangement.

Because of the high temperatures at which accumulated soot is periodically burned off, the yarn should be ceramic, and preferably continuous-filament, ply-twisted ceramic yarn to afford sufficient strength to allow the yarn to be wound tightly to stay in place against the force of the exhaust. A continuous-filament, ply-twisted yarn can be texturized to cause loops of continuous filaments to project outwardly without substantial breakage of filaments. Especially useful are continuous-filament ceramic yarns of alumina-boria-silica fibers available commercially as NEXTEL TM 312 or 440 ceramic yarn from the 3M Co. A diesel particulate trap as per the Bloom application made with texturized ceramic yarn should be at least as efficient and durable as any known diesel particulate trap, but because of the high cost of the ceramic yarn, it may be thought to be too expensive for general use.

The disclosure of the Bloom application is incorporated herein by reference.

SUMMARY OF THE INVENTION

The invention provides a diesel particulate trap which can be made using substantially less yarn than required to make a trap of equal efficiency based on the Bloom application. Hence, the novel trap provides economies both in cost of raw material and in reduced time to wind the yarn onto perforated tubes.

Like diesel particulate traps of the Bloom application, that of the invention has (a) a casing having at least two ends, (b) means for connecting the ends of the casing to an exhaust system, (c) contains at least one perforated hollow tube, (d) means for blocking spaces at the ends of the casing to require exhaust entering an unblocked space at one end of the casing to pass generally radially through each tube, and (e) a filtering element comprising heat-resistant yarn helically cross-wound on each tube to form a plurality of layers of yarn, which yarn has a core from which filaments or fiber segments project outwardly, the cores of convolutions of each layer being spaced to afford substantially uniform four sided (diamond-shaped) openings within which the projecting fiber segments intermesh to form traps for particles carried by the exhaust.

The diesel particulate trap of the invention differs from that of Bloom in that cores of convolutions of at least one layer are laterally offset from cores of convolutions of an adjacent layer to deflect the generally radial exhaust flow into tortuous paths.

To achieve the aforementioned reduction in yarn, the filtering element should have at least 4 layers of yarn (preferably from 10 to 30 layers), and the cores of convolutions of at least 3 layers (preferably from 5 to 15 layers) should be laterally offset from cores of convolutions of the underlying layer.

In a filtering element of the present invention, cores of convolutions of adjacent offset layers are more closely spaced from each other than are cores of convolutions of the same layer. Closer spacings afford better support to the fiber segments, thus reducing damage and also enabling each fiber segment to support a greater density of soot, advantages that can be attained while keeping back pressures satisfactorily low. In contrast, when all cores of successive convolutions are radially aligned with the cores of underlying convolutions, any reduction in spacing between cores increases the back pressure.

When an electrical heating element is employed to regenerate a filtering element of the present invention, radiation losses are reduced by the heat-insulating properties of laterally offset yarn cores. However, the cores of yarn convolutions close to the electrical heating element preferably are radially aligned to provide walls. These larger four sided openings enhance the ignition of soot trapped close to the heating element. After that soot has been ignited, its burning produces additional heat that readily ignites more remote soot in spite of heat barriers resulting from laterally offset yarn cores.

As is taught in the Bloom application, the yarn preferably is wound at an angle of from 30° to 70° to the axis of the tube, more preferably from 45° to 55°. In consequence, convolutions of yarn laid down in the first cross-wound circuit of each layer must be interspersed with subsequent convolutions until the spacings between the cores of adjacent convolutions are substantially uniform across a layer. As in Example 2, a single layer requires eight down-and-back circuits on a 5-cm diameter tube at an initial winding angle of 46° to the axis of the tube to obtain a center-to-center core spacing (here called the "Filter Band Width") of about 1.5 cm between midpoints of opposite sides of each four sided opening.

By selecting the sizes of the four sided openings, the heights and levels of any walls, and the number and degree of lateral offsets, the filtering element can be tailored to distribute soot uniformly. This permits more soot to be collected before it must be burned off, thus saving energy by lengthening the times between regenerations. Also, more concentrated burning soot creates more heat and so reduces the energy required for each regeneration.

As in the Bloom application:

(a) the perforated tube or tubes can be made from a tube formed with a variety of shaped openings, tubular wire screen, or tubular expanded metal, and should have an imperforate area at each end; the perforations should be as large as possible while maintaining rigidity, and each perforation preferably is from about 1 to 20 mm in diameter, when circular, and more preferably from 3 to 7 mm; the perforations preferably occupy from about 40 to 80% of the total projected perforated area of each tube; and the filtering element covers the entire perforated area;

(b) the yarn preferably is texturized continuous-filament ceramic yarn;

(c) the yarn preferably is texturized immediately prior to the winding so that each turn of the yarn becomes compacted only where it contacts the core of another turn of the yarn; and (d) at the imperforate areas, adjacent convolutions of the yarn are closely wound to provide relatively thick end walls that are substantially impervious to the flow of exhaust.

While the Bloom application suggests a winding tension from about 9.8 to about 19.6 Newtons, a lower winding tension is feasible in the present invention because the interlocking between laterally offset convolutions enhances stability. Furthermore, a high winding tension would produce an undesirable compaction where convolutions are supported by fiber segments of the underlying layer. Hence, winding tensions of from 4 to 13 Newtons are preferred.

For most uses, the core of the yarn preferably has a diameter of at least 0.5 mm, more preferably from 1 to 10 mm; the filtering element preferably has a thickness from about 1 to 150 mm, more preferably from 5 to 30 mm, and the Filter Band Width of the four sided openings preferably is from 0.25 to 10 cm, more preferably from 0.8 to 2 cm.

BRIEF DESCRIPTION OF THE DRAWING

The invention may be more easily understood in reference to the drawing, all figures of which are schematic.

In the drawing.

DESCRIPTION OF THE PREFERRED EMBODIMENTS

Figure 1:
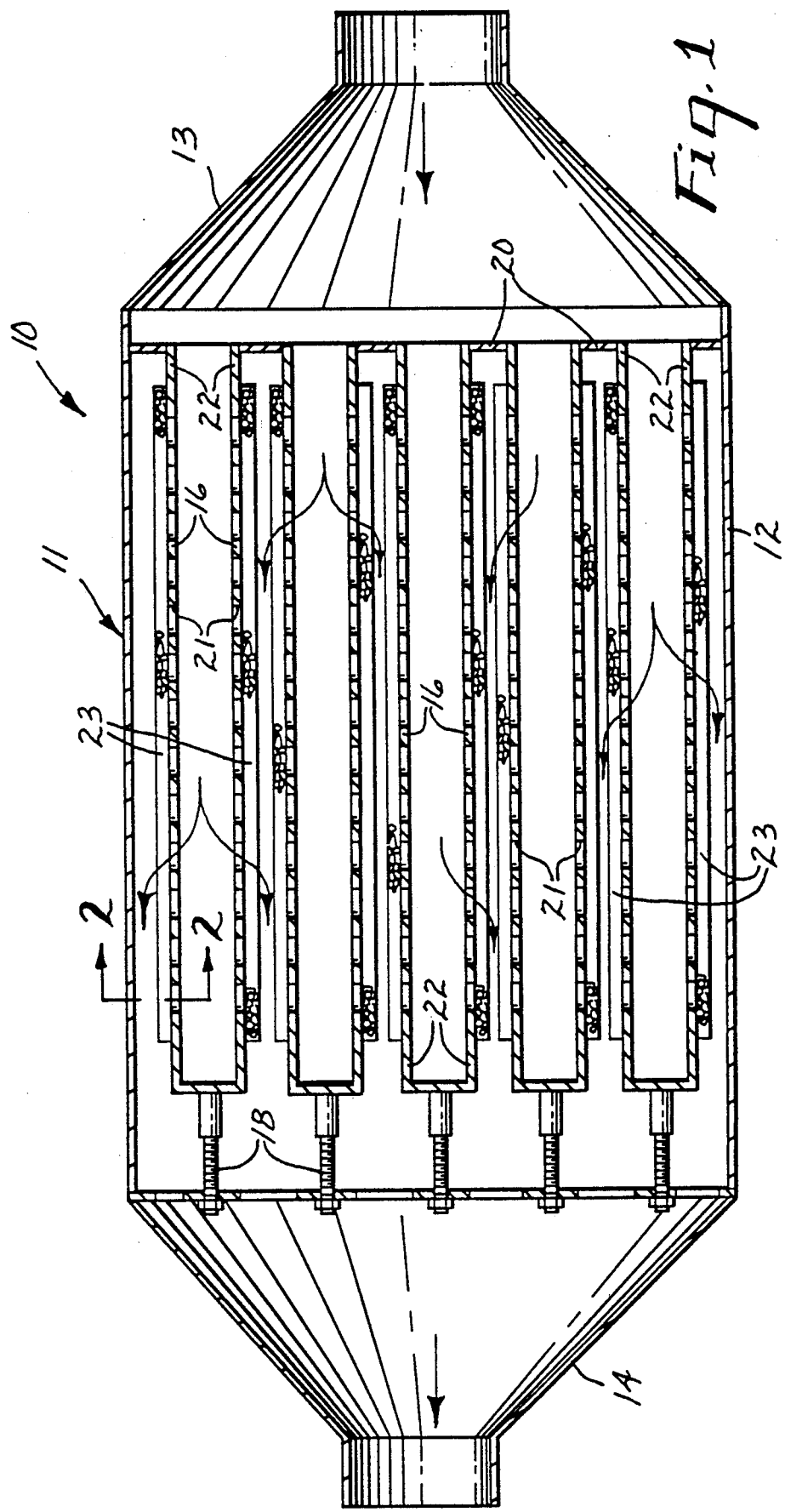
FIG. 1 is a longitudinal central section through a diesel particulate trap of the invention.
Figure 3:
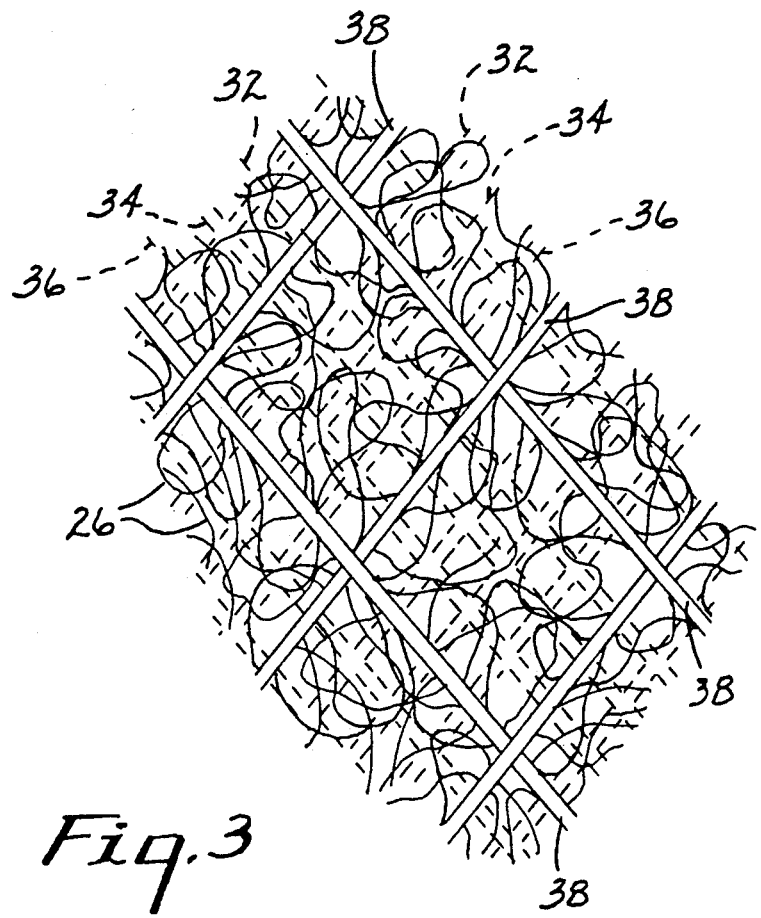
FIG. 3 shows a portion of the surface of the filtering element of FIG. 2.
Figure 2:
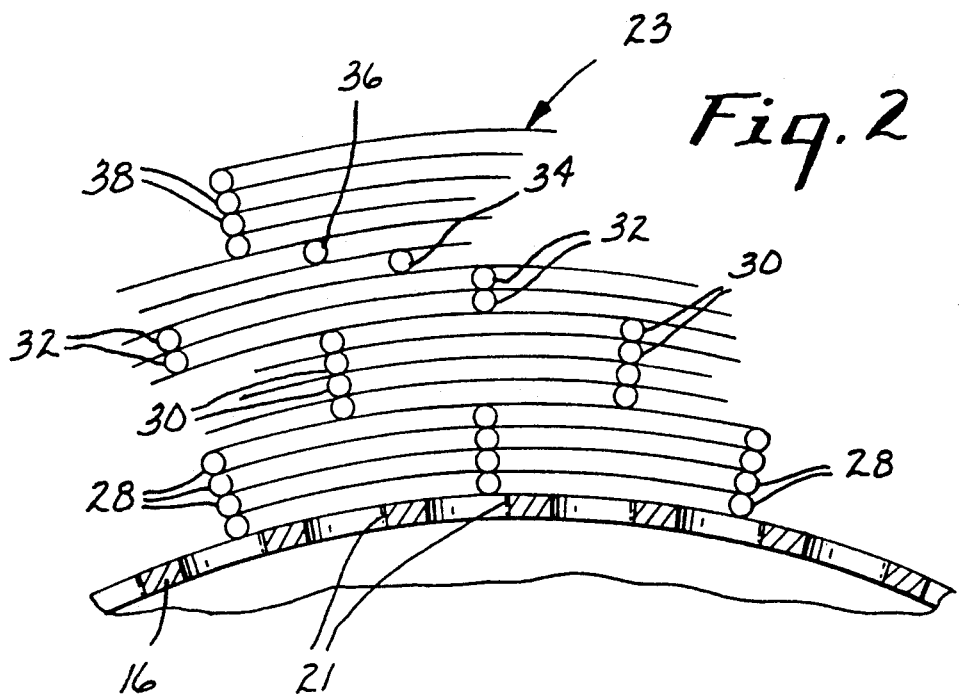
FIG. 2 is a cross section along line 2—2 of FIG. 1 with parts removed to show only a portion of a filtering element, greatly enlarged.

The diesel particulate trap 10 of FIGS. 1-3 has an elongated casing 11 having a cylindrical body 12, a conical exhaust inlet 13, and a conical exhaust outlet 14. Within the cylindrical body are thirteen parallel, side-by-side cartridges, each including a rigid, hollow, perforated tube 16. Each tube is closed adjacent the exhaust outlet and open adjacent the exhaust inlet, and each closed end is secured to an end wall by a post 18. Welded to the tubes at their open ends is a circular plate 20 that is formed with circular openings to receive the tubes. Plate 20 also is welded to cylindrical body 12, thus blocking the spaces between adjacent tubes and between the tubes and casing 11 so that exhaust entering inlet 13 passes generally radially outwardly through perforations 21 in each of the tubes before exiting through an unblocked space adjacent outlet 14. Each of tubes 16 is perforated except for an imperforate area 22 at each of its extremities.

Covering the perforated area and part of the imperforate areas of each tube is a filtering element 23 that has been formed by winding a heat-resistant yarn onto the tube. Subsequent layers were formed with texturized yarn having a core from which filament loops or fiber segments 26 project outwardly. To do this, the tube 16 was temporarily mounted on the mandrel of a winding machine (not shown) which applied the yarn under computer control. The several down-and back circuits in each layer inherently resulted in interweaving of oppositely directed convolutions (as indicated in FIG. 3), thus helping to stabilize the filtering element against exhaust forces.

The core of each successive convolution of the first four layers 28 of untexturized yarn was tightly wound against and radially aligned with the core of an underlying convolution. The radially aligned cores together form spaced walls defining a first set of four sided openings that are funnel-shaped as viewed in FIG. 2.

By rotating the mandrel 23° before applying a second set of four layers 30 of texturized yarn, their cores of radially aligned convolutions bisect the four sided openings formed by the first four layers 28, thus forming a second set of four sided openings within which the projecting fiber segments 26 are intermeshed to form soot traps. After rotating the mandrel another 23°, a third set of two yarn layers 32 were laid down to form a third set with four sided openings. As seen in FIG. 2, the cores of radially aligned yarn convolutions of the third set of layers 32 bisect the second set of four sided openings and are radially aligned with the cores of convolutions of the first set of four layers 28.

The mandrel was then rotated 11.5° before applying a single-yarn fourth layer 34 that forms a fourth set of four sided openings. Each core of a convolution of the fourth layer 34 is laterally offset 25% of the distance across four sided openings of the third set of layers 32.

The mandrel was again rotated 11.5° before applying a single-yarn fifth layer 36 that forms a fifth set of four sided openings. Each core of a convolution of the fifth layer 36 bisects four sided openings of the third set of layers 32 and is radially aligned with cores of convolutions of the second set of layers 30.

The mandrel was again rotated 11.5° before applying a sixth set of four yarn layers 38 that are radially aligned to form a sixth set of 4-sided openings. Each convolution of the yarn cores of the sixth layers 38 bisects spaces between cores of convolutions of the fifth layer 36 and cores of convolution of the third set of layers 32. The resulting filtering element 23 on each of the tubes 16 contained sixteen layers of yarn.

As is taught in the Bloom application, when applying each successive yarn layer of the filtering element 23, the winding angle is slightly increased (e.g., about 0.25°) either to place the yarn core in radial alignment with the underlying core of the previous layer or to provide a desired lateral offset.

The outward flowing exhaust is deflected into tortuous paths by the laterally offset yarn cores of the outer five sets of layers of the filtering element 23.

The four sided openings formed by the yarn layers 28, 30, 32, 34, 36, and 38 are substantially uniform and diamond-shaped as viewed in FIG. 3.

By forming the perforated tubes 16 of electrically resistive material and periodically applying an electrical voltage across each tube, each filtering element 23 can be cleaned whenever that voltage is applied to burn off collected soot.

Figure 4:
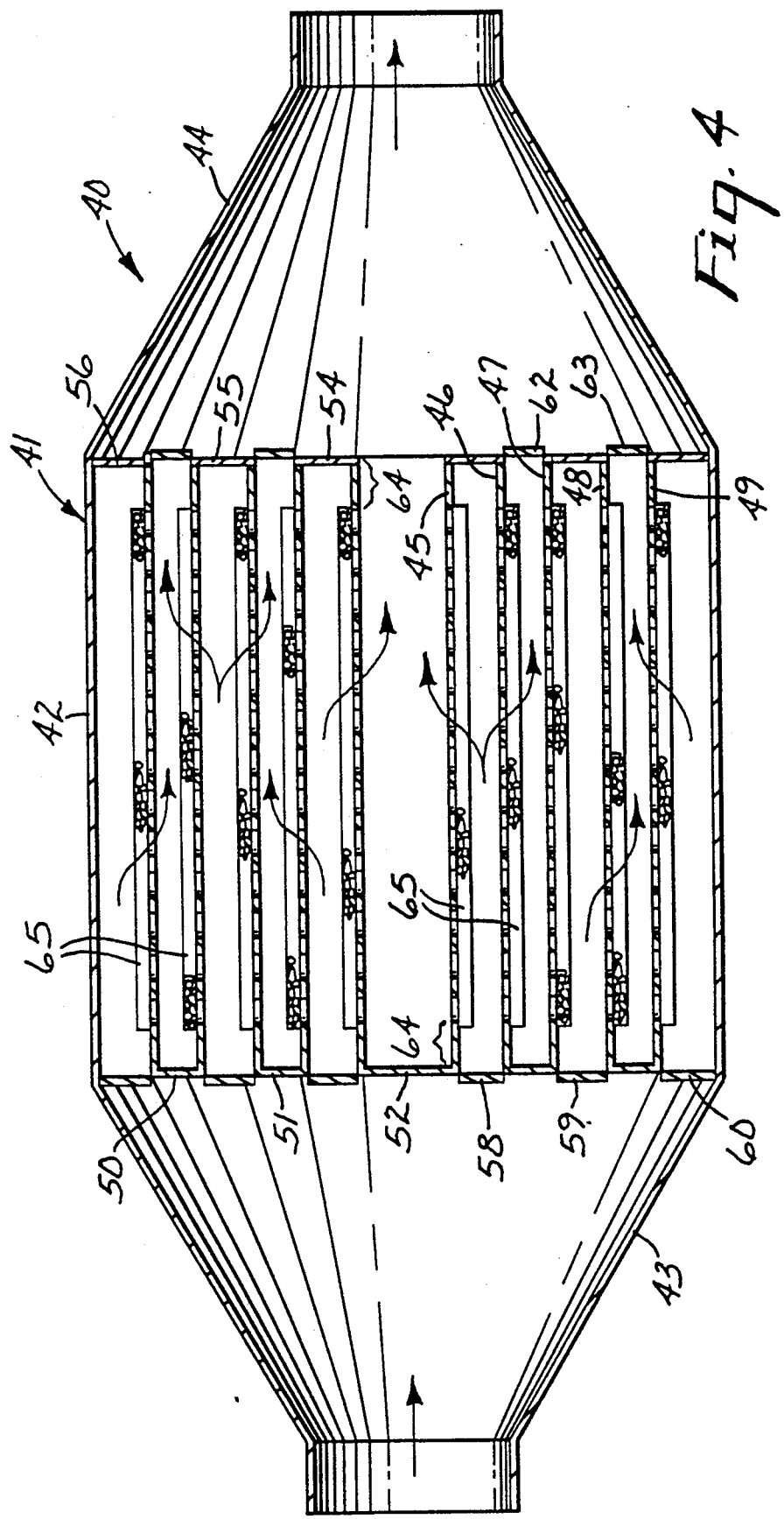
FIG. 4 is a longitudinal central section through a second diesel particulate trap of the invention.

The diesel particulate trap 40 of FIG. 4 has an elongated casing 41 having a cylindrical body 42, a conical exhaust inlet 43, and a conical exhaust outlet 44. Within the cylindrical body are five concentric, rigid, hollow, perforated tubes 45, 46, 47, 48 and 49 that radially fill cylindrical body 42. At the inlet extremities of the tubes are annular caps 50 and 51 and a central circular cap 52. At the outlet extremities of the tubes are annular caps 54, 55 and 56. Bridging adjacent caps at the inlet extremities of the tubes are thin struts 58, 59 and 60, the outermost of which, 60, is also connected to the casing 41. Adjacent caps are similarly bridged by thin struts 62 and 63 at the outlet extremities of the tubes.

Each of the five concentric tubes 45, 46, 47, 48 and 49 has imperforate area 64 at its extremities, and its perforate area is covered with a filtering element 65 that has been made in the same manner as one of the filtering elements 23 of FIGS. 1–3. Exhaust entering the unblocked spaces adjacent inlet 43 passes into spaces between the tubes that are not blocked by caps 50, 51 and 52 and radially inwardly and outwardly through perforations of the filtering elements 65 before exiting through spaces not blocked by caps 54, 55 and 56 adjacent outlet 44.

To reduce the cost of raw materials in making a diesel particulate trap of the invention, the filtering elements can incorporate one or more layers of nonwoven mats of inorganic fiber that are selected to afford a high degree of filtering efficiency without significant back pressure. A preferred nonwoven mat includes ceramic blown microfibers such as alumina-boria-silica blown microfibers. Suitable nonwoven mats are available as Ultrafiber TM 312, 440 and 550 from the 3M Co. and as Saffil TM LD mat from Imperial Chemicals, Inc. Such mats can be interspersed between layers of windings and/or at the radially inner and outer surfaces of a filtering element. When employed at the outer surface, such a mat can have a desirable heat-insulating effect that both conserves energy and helps to keep the casing cool.

For making a filtering element, useful heat-resistant yarns include special high temperature glass fibers, such as S-2 glass or E glass from Owens Corning, continuous fused silica fibers (such as Astroquartz TM), leached glass fibers (such as Refrasil TM), nonvitreous ceramic fibers (such as Nicalon TM), fibers of ceramic metal oxides combined with nonmetal oxides (such as zirconia silica, alumina-silica, graphite, alumina-chromia-metal oxide, and preferably alumina-boria-silica (such as Nextel TM 312, 440 or 550). For applications below about 330° C., conventional glass fibers can be used.

To aid in the oxidation of carbon and soluble organic constituents (e.g., hydrocarbons and carbon monoxide) of diesel exhaust soot particulates, the filter element can further comprise an oxidation catalyst coated onto the inorganic yarn, inorganic nonwoven mat, or a combination thereof. Such oxidation catalysts are known in the art and include, for example, precious metals (e.g., platinum, rhodium, other platinum group metals, and silver) and base metals (e.g., copper, iron, maganese, and potassium). Methods for coating the catalyst onto the inorganic yarn and nonwoven mat are known in the art.

When a filtering element comprises texturized, continuous-filament ceramic yarn, it may be desirable to incorporate some heat-fugitive fibers. Passageways created when the fugitive fibers are burned away during or prior to the first use of the trap may provide both reduced back pressure and enhanced access to the filtering fiber segments.

The novel diesel particulate trap can incorporate means for periodic burn-off of accumulated particulates, e.g., by periodically heating the exhaust to a temperature above the combustion point of the trapped particulate matter. Useful electrical combustion techniques are taught in European patent application, Publ. No. 0,275,372 (Gürtler et al.) which was laid open Jan. 3, 1990, and in U.S. patent application Ser. No. 07/680,812, filed Apr. 5, 1991 (Bloom et al.), the disclosure of which are incorporated herein by reference. Instead, the trapped particulate matter can be burned away by passing hot gas through the diesel particulate trap.

EXAMPLE 1

A diesel particulate trap was made with an elongated casing having a cylindrical body and attached conical exhaust inlet and outlet substantially as illustrated in FIG. 1. Mounted within the cylindrical body was a 2×2 array of four parallel cartridges, each containing a rigid, hollow, perforated tube. Each tube was formed from expandable metal (Inconel TM 600D manufactured by Inco Alloys) that had been expanded to a length of 25.4 cm and a diameter of 3.8 cm to have an electrical resistance of 0.22 ohm. Each opening in the expanded metal was about 100 $mm^2$ in area, and the openings together occupied 61% of the perforated area of each tube. The end of each tube was closed by a cap adjacent the exhaust outlet, and there was a collar at the other end leaving the tube open adjacent the exhaust inlet. A circular plate adjacent the exhaust inlet blocked the spaces between the collars of adjacent tubes and between the collars and the cylindrical body, without blocking the open ends of the tubes. The cap and collar reduced the perforated length of each tube to 22.9 cm.

Using a computer-controlled filament winder (Automation Dynamics Model #HWC-860), heat-resistant yarn was cross-wound at a tension of about 12.75 Newtons to cover the perforated area of each tube in the manner of FIGS. 1–3. The yarn was continuous-filament, ply-twisted ceramic yarn of alumina-boria-silica fibers (namely Nextel TM 312, 1800 denier 2/2 1.5z yarn), of which one portion had a low degree of texturization, another had a moderate degree of texturization, while a third had not been texturized). The untexturized yarn was about 0.18 cm in diameter, while the filament loops of each of the low-texturized and medium-texturized yarn provided an envelop about 1–5 cm in diameter. Individual filaments were about 10–12 μm in diameter.

First, five layers of radially-aligned untexturized yarn were applied at an initial winding angle of 47° to provide an initial Filter Band Width of 8.15 mm, and there were ten circuits per layer.

After advancing the mandrel of the filament winder 23.5°, eight layers of the low-texturized yarn were applied to form radial walls bisecting the four sided openings of the first five layers.

After advancing the mandrel another 23.5°, eight layers of the medium-texturized yarn were applied to form radial walls bisecting the four sided openings of the preceding eight layers.

The filtering element of the resulting cartridge had a diameter of about 5.8 cm, and its yarn content was about 170 g.

The cartridges were assembled into two identical diesel particulate traps, each of which was placed in the exhaust system of a 2.3-liter, four-cylinder, four-stroke, indirect-injection diesel engine ("Cummins 4A2.3" from Cummins Engine Co. of Columbus Ohio). The particle trapping efficiency of the diesel particulate trap was measured using conventional multiple batch filter sampling upstream and downstream of the trap using the filter handling procedures outlined in 40 CFR 986.1339-86 (1989), the disclosure of which is incorporated herein by reference. The membrane filters used were 90 mm in diameter ("Pallflex Teflon Membrane Filters" from Pallflex Products Corp. of Putnam, Conn.).

The soot-loaded diesel particulate trap was regenerated with a 12-volt d.c. power supply for 4.5 minutes at an air flow of 1.88 liters/sec., thus reducing the back pressure to 25.5 cm of water at a flow rate of 60 liters/sec.

COMPARISON TEST

A diesel particulate trap (here called "C-1") was made in the same manner as that of Example 1 except that in making the filtering elements of C-1, the same yarn was applied so that the core of each successive convolution was radially aligned with the core of an underlying convolution. The initial Filter Band Width of the C-1 was 6.2 mm and was selected so that it and the trap of Example 1 would have comparable filtering performance. C-1 was made to have 20 layers as follows:
first 4 layers untexturized yarn
next 8 layers low-texturized yarn
last 8 layers medium-texturized yarn
The total yarn content per cartridge was 300 g.

Average test results are reported in Table I.

TABLE 1

|      | A       | B       | C     | D    | E     |
|------|---------|---------|-------|------|-------|
| Ex. 1 | 12.7 cm | 30 min. | 0.9 g | 90%  | 170 g |
| C-1  | 17.7 cm | 30 min. | 1.0 g | 93%  | 300 g |

A = initial back pressure in cm of water at a flow of 60 liters/sec at 46° C.
B = time to trap soot to increase back pressure to 152 cm of water
C = average amount of soot trapped per cartridge during time B
D = efficiency at 127 cm of water back pressure
E = average filter media weight Differences in values for C and D are within experimental error. The significantly increased back pressure (item A) of C-1 compared to Example 1 was due to Example 1 having 43% less yarn.

EXAMPLE 2

A cartridge for a diesel particulate trap was made as in Example 1 except it contained a single cartridge. A metal tube (Inconel TM 600D manufactured by Inco Alloys) was punched to form elliptical openings that were about 0.75 cm in diameter in the circumferential direction and 0.05 cm in diameter in the axial direction of the tube. The length of the tube was 38.7 cm, its diameter was 5.1 cm, and it had an electrical resistance of 0.3 ohm. Its openings occupied about 50% of the total projected perforated area of the tube.

The yarn was continuous-filament, ply-twisted ceramic yarn of alumina-boria-silica fibers (namely Nextel TM 440) 2000 denier 2/2 1.5 z yarn that had a diameter of about 0.2 cm before being highly texturized to produce an envelope of filaments loops about 5-7 cm in diameter. Individual filaments were about 13-15 μm in diameter.

The yarn was wound with a constant tension of 10.7N. The initial winding angle was 46° to provide a Filter Band Width of 1.5 cm, and there were eight circuits per layer and 28 layers as follows:

| No. of layers | Cumulative Mandrel Advance |
|---------------|---------------------------|
| 6             |                           |
| 6             | 23°                       |
| 4             | 46°                       |
| 2             | 57.5°                     |
| 2             | 69°                       |
| 8             | 80.5°                     |

The filtering element of the resulting cartridge had an outside diameter of 7 cm and contained 215 g of yarn.

The cartridge was placed in the exhaust system of a 5.9-liter turbo-charged diesel engine ("Cummins 6A3.4") set at 1200 r.p.m. with 6.9 Mpa hydraulic load to 77.9 liters/sec. flow rate. The cartridge had a starting back pressure of 22.9 cm of water and was loaded to 203 cm of water. The cartridge was weighed before and after loading and found to hold 2.4 g of soot. Efficiency was checked during loading using a mass sampling system and was found to be 87% at a back pressure of 127 cm of water.

The soot-loaded cartridge was regenerated with a 24-volt d.c. power supply over a period of five minutes, thus returning the back pressure to about 28 cm of water.

This soot-collecting and regenerating cycle was repeated ten times with 23 minutes between regenerations. At the end of each cycle, the back pressure was about 28 cm of water.

What is claimed is:

1. A diesel particulate trap comprising
   (a) a casing having at least two ends,
   (b) means for connecting said at least two ends of said casing to an exhaust system,
   (c) means for supporting at least one tube;
   (d) at least one hollow tube extending between said at least two ends of said casing, said at lest one tube having two ends, an outer surface, and perforations that provide a perforated area, said at least one tube being supported by said supporting means;
   (e) means for blocking spaces at said at least two ends of said casing to force exhaust entering an unblocked space at one end of said casing to pass generally radially through each at least one tube, and
   (f) a filtering element comprising heat-resistant yarn helically cross-wound on each at least one tube to form a plurality of layers of yarn, which yarn has a core from which filaments or fiber segments project outwardly, wherein successive convolutions are oppositely wound in each layer to provide interwoven cores, cores of convolutions of each layer being spaced to afford substantially uniform four-sided openings within which said projecting fiber segments intermesh to form traps for particles carried by exhaust, and cores of convolutions of at least one layer being laterally offset from cores of convolutions of an adjacent layer to deflect generally radial exhaust flow into tortuous paths therethrough.

2. The trap of claim 1 comprising at least two of said hollow tubes, with the axes of said at least two tubes being parallel and said filtering elements being spaced from each other.

3. The trap of claim 2 wherein said at least two tubes are concentric and said blocking means block spaces between said at least two tubes at said two ends of said at least two tubes, with adjacent spaces being blocked only adjacent alternate ends of said at least two tubes.

4. The trap of claim 2 wherein said at least two tubes are side-by-side and said blocking means block one end of each of at least two tubes only adjacent one end of said casing and block spaces between the at least two tubes only adjacent the other end of said casing.

5. The trap of claim 1 wherein said heat-resistant yarn comprises ceramic yarn.

6. The trap of claim 6 wherein said ceramic yarn comprises continuous-filament yarn from which loops of continuous filaments and/or fiber segments project outwardly.

7. The trap of claim 1 wherein each convolution of said yarn at said perforated area of each at least one tube extends at an angle of from 30° to 70° to the axis of said at least one tube.

8. The trap of claim 1 wherein the core of said yarn has a diameter of from 1 to 10 mm.

9. The trap of claim 8 wherein each of said fiber segments projecting from said core of said yarn has a diameter from 5 to 30 μm.

10. The trap of claim 1 wherein said filtering element has a thickness from 5 to 30 mm.

11. The trap of claim 1 wherein said at least one tube is selected from the group consisting of a tube formed with shaped openings, tubular wire screen, and tubular expanded metal, and there is an imperforate area at each end of said at least one tube.

12. The trap of claim 11 wherein at said imperforate areas, said yarn is closely wound to provide relatively thick end walls that are substantially impervious to the flow of exhaust.

13. The trap of claim 1 wherein said cores of at least one layer of said yarn are radially aligned with cores of an underlying layer, and the radially aligned cores together form walls.

14. The trap of claim 13 wherein each filtering element has from 10 to 30 layers of yarn.

15. The trap of claim 14 wherein the cores of convolutions of from 5 to 15 layers are laterally offset from cores of convolutions of the underlying layer.

16. A diesel particulate trap comprising
(a) a casing having at least two ends,
(b) means for connecting said at least two ends of said casing to an exhaust system,
(c) means for supporting at least one tube,
(d) at least one hollow tube extending between said at least two ends of said casing, said at least one tube having two ends, an outer surface, and perforations that provide a perforated area, said at least one tube being supported by said supporting means,
(e) means for blocking spaces at said at least two ends of said casing to force exhaust entering an unblocked space at one end of said casing to pass generally radially through each at least one tube, and
(f) a filtering element comprising heat-resistant yarn helically cross-wound on each at least one tube to form a plurality of layers of yarn, which yarn has a core from which filaments or fiber segments project outwardly, wherein successive convolutions are oppositely wound in each layer to provide interwoven cores, cores of convolutions of each layer being spaced to afford substantially uniform four-sided openings within which the projecting fiber segments intermesh to form traps for particles carried by exhaust, wherein the improvement comprises
cores of convolutions of at least one layer being laterally offset from cores of convolutions of an adjacent layer to deflect generally radial exhaust flow into tortuous paths.

17. A cartridge useful in a diesel particulate trap, said cartridge comprising
(a) a perforated hollow tube,
(b) a filtering element comprising heat-resistant yarn helically cross-wound on said tube to form a plurality of layers of yarn, which yarn has a core from which filaments or fiber segments project outwardly, wherein successive convolutions are oppositely wound in each layer to provide interwoven cores, cores of convolutions of each layer being spaced to afford substantially uniform four-sided openings within which said projecting fiber segments intermesh to form traps for particles carried by exhaust, cores of convolutions of at least one layer being laterally offset from cores of convolutions of an adjacent layer to deflect into tortuous paths exhaust gases flowing generally radially through said cartridge, and
(c) means for mounting said cartridge in a diesel particulate trap.

18. Method of making a cartridge that is useful in a diesel particulate trap, said method comprising the sequential steps of
(a) providing at least one perforated hollow tube,
(b) helically cross-winding on said at least one tube a first layer of convolutions of yarn having a core from which filaments or fiber segments project outwardly, successive convolutions being oppositely wound in each layer to provide interwoven cores, which convolutions initially are widely spaced and then are interspersed with subsequent convolutions until said cores of adjacent convolutions are substantially uniformly spaced and define four-sided openings within which said projecting fiber segments intermesh to form traps, and
(c) helically cross-winding over said first layer at least one additional layer of said yarn, said cores of which define similar openings bridged by similar traps and are laterally offset from said cores of said first layer, thus deflecting into tortuous paths gases flowing generally radially through said cartridge.

19. The method of claim 18 further comprising an additional step of helically cross-winding a third layer over at least one of said first and additional layers of convolutions such that said cores of convolutions of said third layer are radially aligned with cores of convolutions of an underlying layer, and said radially aligned cores together form walls.

* * * * *

UNITED STATES PATENT AND TRADEMARK OFFICE
CERTIFICATE OF CORRECTION

PATENT NO. : 5,248,481
DATED : September 28, 1993
INVENTOR(S) : Richard L. Bloom, Troy K. Ista, and Mark P. Smith It is certified that error appears in the above-indentified patent and that said Letters Patent is hereby corrected as shown below:

Col. 8, line 51, "lest" should read --least--.
Col. 9, line 23, "claim 6" should read --claim 5--.

Signed and Sealed this

Tenth Day of January, 1995

BRUCE LEHMAN

Attest:

Attesting Officer

Commissioner of Patents and Trademarks